(12) United States Patent
Boussie et al.

(10) Patent No.: US 6,828,096 B1
(45) Date of Patent: Dec. 7, 2004

(54) POLYMER LIBRARIES ON A SUBSTRATE, METHOD OF FORMING POLYMER LIBRARIES ON A SUBSTRATE AND CHARACTERIZATION METHODS WITH SAME

(75) Inventors: Thomas R. Boussie, Menlo Park, CA (US); Martin Devenney, Mountain View, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/567,598

(22) Filed: May 10, 2000

Related U.S. Application Data

(63) Continuation-in-part of application No. 09/156,827, filed on Sep. 18, 1998, now abandoned.

(51) Int. Cl.[7] .................................................. C12Q 1/68
(52) U.S. Cl. ..................... 435/6; 427/265; 427/269; 427/272; 427/535; 436/527; 356/51
(58) Field of Search ................... 427/265, 269, 427/272, 535; 435/6, 7.1; 436/527; 356/51

(56) References Cited

U.S. PATENT DOCUMENTS

| | | | | |
|---|---|---|---|---|
| 5,510,628 A | * | 4/1996 | Georger, Jr. et al. | 257/32 |
| 5,512,131 A | | 4/1996 | Kumar et al. | |
| 5,976,625 A | * | 11/1999 | Bhandarker et al. | 427/269 |
| 5,985,356 A | * | 11/1999 | Schultz et al. | 427/8 |
| 6,030,917 A | | 2/2000 | Weinberg et al. | |

FOREIGN PATENT DOCUMENTS

| | | | | |
|---|---|---|---|---|
| WO | WO 93/09668 | * | 5/1993 | A01N/1/02 |
| WO | WO98/03521 | | 1/1998 | |
| WO | WO 98/15501 | | 4/1998 | |
| WO | WO 98/15813 | | 4/1998 | |
| WO | WO 98/28623 | * | 7/1998 | G01N/33/543 |
| WO | WO 99/59716 | | 11/1999 | |
| WO | WO 00/17413 | | 3/2000 | |

OTHER PUBLICATIONS

Meredith et al., Macromolecules (2000) 33: 5760–5762 "High Through–put Measurement of Polymer Blend Phase Behavior".
Kim et al., J. Am. Chem. Soc. (1996) 118: 5722–5731 "Micromolding in Capillaries: Applications in Materials Science".
Xia et al., Chem. Mater, (1996) 8 (3): 601–603 "Microcontact Printing of Alkanethiols on Copper and Its Application in Microfabrication".
Xia et al., J. Electrochem. Soc. (1996) 143(3): 1070–1079 "Microcontact Printing of Alkanethiols on Silver and Its Application in Microfabrication".
Nielsen et al., Polym. Mater.Sci.Eng. (1999), 80:92 "The Preparation And Rapid Screening Of Combinatorial Polymer Libraries".

* cited by examiner

*Primary Examiner*—Bennett Celsa
*Assistant Examiner*—Jon D. Epperson

(57) ABSTRACT

This invention relates to a method to characterize an array of polymeric materials comprising: depositing unsilanizable material onto a silanizable substrate in at least 10 regions, thereafter contacting the substrate with an organosilane agent thereby silanizing the substrate but not the unsilanizable material in said regions, optionally, partially or completely removing the unsilanizable material, depositing at least 10 polymeric materials onto said regions, and characterizing the materials. This invention also relates to method for forming an array of polymeric materials to be characterized onto a substrate comprising: (a) selecting ten or more polymers, (b) dissolving or suspending each polymer in a separate liquid, and (c) depositing a uniform amount of each of the ten or more polymer containing liquids onto a substrate in individual hydrophilic and/or hydrophobic regions.

46 Claims, 2 Drawing Sheets

POLYMER LIBRARIES ON A SUBSTRATE, METHOD OF FORMING POLYMER LIBRARIES ON A SUBSTRATE AND CHARACTERIZATION METHODS WITH SAME

BENEFIT CLAIM

This application is a continuation-in-part of and claims the benefit under 35 U.S.C. § 120 to commonly assigned U.S. patent application Ser. No. 09/156,827, filed Sep. 18, 1998 now abandoned, which is incorporate by reference herein.

FIELD OF THE INVENTION

This invention generally relates to methods for the creation of a library of polymeric materials at known locations on a substrate surface to facilitate performance of rapid analytical procedures. This invention also relates to the arrays of polymeric materials created by such methods and analyzing such arrays of polymeric materials.

BACKGROUND OF THE INVENTION

Recently, there have been several developments in the area of high through-put screening for catalysts and other reactive chemicals. For example, U.S. Pat. No. 6,030,917, inter alia, discloses methods for the preparation and screening of large numbers of organometallic compounds which can be used not only as catalysts, but also as additives and therapeutic agents. Also, U.S. Pat. No. 5,985,356 discloses methods of preparing and screening polymeric materials in array format. In U.S. Pat. No. 6,030,917, for example, libraries of catalysts and organometallic compounds may be synthesized, screened and characterized by synthesizing a spatially segregated array of ligands, combining the ligands with metal precursors, activating the ligand-metal precursor combination, and thereafter combining the activated compound with a third element, such as an olefin for polymerization. Thereafter the product may be rapidly screened using various characterization techniques.

Co-pending commonly assigned U.S. patent application Ser. No. 09/156,827, filed Sep. 18, 1998 (WO 00/17413, published Mar. 30, 2000) discloses forming an array of components at pre-defined locations and that hydrophobic materials can be used to coat the region surrounding the individual reaction regions on a substrate. In part, the application states that " . . . by choosing appropriate material (e.g., substrate material, hydrophobic coatings, reactant solvents, etc.), one can control the contact angle of the droplet with respect to the substrate surface. Large contact angles are desired because the area surrounding the reaction region remains unwetted by the solution within the reaction region."

In the specific instance where combinatorial methods are used to screen for polymerization catalysts, polymers are typically the desired end product. Generally speaking when olefins, diolefins, acetylenically unsaturated compounds, or other polymerizable monomers, are polymerized (possibly in array format), discrete amounts of polymer are produced. It is then desirable to screen these polymers to determine if they have desired target properties. Most screening or characterization methods however, particularly those codified as ASTM procedures, require large amounts of polymer to perform the tests and require significant time to measure each sample. The polymers produced in the arrays are typically present in both large numbers and small amounts, and thus many ASTM methods are not practical for characterization. It follows then that with new array based rapid screening technologies, new rapid methods to characterize the products, such as polymers, are now also needed.

The high-throughput screening of polymer films using many different analytical methods (such as scanning Fourier Transform infrared spectroscopy (FTIR)) requires control of the arrangement of the polymer samples on a substrate, as well as control of film properties such as the sample size, sample thickness, and sample uniformity. Polymer films created through evaporative deposition require some method of confinement of the liquid samples to fixed positions on the substrate. Thicker polymer film preparation, which typically employs multiple cycles of evaporative deposition, requires a method of reproducible deposition to the same position on the substrate.

In attempts to address this problem, multiple drops of polymer in solution may be deposited onto a gold coated silicon wafer. The drops typically run or will not remain in one place, particularly when the solvent is flashed off. This is not acceptable for a rapid screening process where the drops have to be in predictable, reproducible spots on the substrate every time. Also, the drops of polymer may not dry evenly, forming a well or doughnut like structure with the bulk of the polymer dried at the rim of the drop. This too is undesirable, although in some embodiments may be acceptable. Certain characterization techniques, such as FTIR, typically require more polymer in the center of the film for measurements. Hence, for some screening techniques, multiple depositions of the polymeric sample to be tested might need to be made. Thus a means to confine the drops to one area reproducibly, such that multiple depositions could be made in the same spot, is needed.

SUMMARY OF THE INVENTION

This invention solves the problems discussed above by providing an array of polymeric materials confined in regions of a substrate by depositing a liquid sample into a region and then relying on the effective chemical potential between a substrate that has been silanized and a liquid sample in a region that has not been silanized. This potential is easily pre-determined as a volume of liquid per unit area of the region, without the need to measure the wetting or contact angle of the sample in the region. In this manner, automated procedures may be easily and effectively invoked for substrate preparation, sample preparation and deposition, and sample screening or characterization.

These and other objects are met by an invention that is a method to characterize an array of polymeric materials comprising:

depositing unsilanizable material onto a silanizable substrate in at least 10 regions, thereafter contacting the modified substrate with an organosilane agent to silanize the substrate but not the unsilanizable material, thereby leaving the at least 10 regions not covered with organosilane, optionally, partially or completely removing the unsilanizable material from the regions, depositing polymeric materials onto said regions, and characterizing the polymeric materials.

This invention further comprises an array of polymeric materials deposited into regions of a substrate. The array format is useful for the characterization of the polymeric materials. The regions of the substrate typically comprise a material that cannot be silanized with an organosilane reagent. In other embodiments, however, this unsilanizable material may be removed prior to depositing the polymeric materials in the regions: In some embodiments of this invention, the regions (e.g., the unsilanizable material) also facilitate the characterization of the polymeric materials by non-transmission characterization methods, such as reflection infrared spectroscopy or X-ray fluorescence. In still other embodiments, the regions (e.g., the unsilanizable material) also comprise a hole extending through the region and the substrate. This hole beneficially allows for transmission spectroscopy by allowing for radiation to go completely through the sample, but is sized so that the dissolved or suspended polymeric materials are prevented from flowing through upon deposition by the surface tension of the sample.

In some aspects, this invention also relates to the work flow that those of skill in the art perform using the methods and arrays of this invention. Typically, this work flow comprises obtaining polymeric samples to be characterized, at least partially dissolving those polymers in an appropriate solvent, and depositing the samples onto regions of a substrate. The substrate is prepared with appropriate regions, as just described, prior to deposition of the polymeric materials. Repeated depositions of samples allows for sufficient sample in the center of the region for those embodiments that require a certain amount of sample at or near the center of the region.

DETAILED DESCRIPTION OF THE INVENTION

Figure 1:
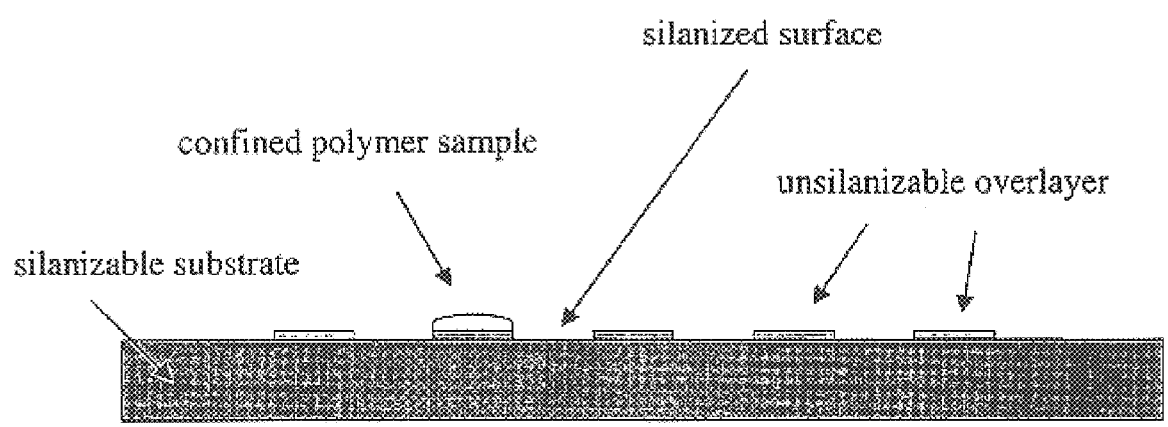
FIG. 1 is a drawing of a silanizable substrate prepared with unsilanizable regions, with one such region having a polymeric sample deposited thereon; the embodiment shown in this figure is useful in non-transmission characterization techniques.

In one aspect this invention provides a method for forming a library of polymeric materials at known locations and confining those materials for characterization procedures. In other aspects, this invention provides libraries of polymeric materials and/or methods of characterizing those materials.

The following terms are intended to have the following general meanings as they are used herein:

Substrate:

A material having a rigid or semi-rigid surface. In many embodiments, at least one surface of the substrate will be substantially flat, although in some embodiments it may be desirable to physically separate regions for different materials with, for example, dimples, wells, raised regions, etched trenches, or the like. In some embodiments, the substrate itself contains wells, raised regions, etched trenches, etc., which form all or part of the regions.

Region:

A region is a predefined localized area on a substrate which is, was, or is intended to be used for formation or deposition of a selected material and is otherwise referred to herein in the alternative as a "known" region, "selected" region, "individual" region, or simply a "region." The region may have any convenient shape, e.g., circular, rectangular, square, elliptical, wedge-shaped, etc. A region is preferably smaller than about 25 $cm^2$, preferably less than 10 $cm^2$, more preferably less than 5 $cm^2$, even more preferably less than 1 $cm^2$, still more preferably less than 1 $mm^2$, and even more preferably less than 0.5 $mm^2$. In most preferred embodiments, the regions have an area less than about 10,000 $\mu m^2$, preferably less than 1,000 $\mu m^2$, more preferably less than 100 $\mu m^2$, and even more preferably less than 10 $\mu m^2$. Also, the regions are separated from each other so that a material in a first region cannot interdiffuse with a material in a second region and thus the regions have a minimum size. This separation is typically accomplished by creating a region that is not silanized on or within a substrate that is silanized, which is discussed below.

Material:

The term "material" is used herein to refer to polymeric materials, which may be compounds, extended solids, extended solutions, clusters of molecules or atoms, crystals, etc. In general, a material is contained within a region on the substrate. However, within a region a material may contain different phases or structures (e.g., a partially crystallized polymer or partially amorphous polymer). The term material is also used when referring to the unsilanizable material, but in such a case, the term "unsilanized" is used before the word material.

Generally, this invention also relates to a method for the rapid characterization of an array of polymeric materials. The array can have as many materials as there are regions on the substrate. For purposes of this invention, the number of materials is typically equal to the number of regions on the substrate, unless certain regions are left empty or used as standards. Dispensing or delivery of the materials to the regions can be accomplished in any one of a number of manual or automatic methods. Although mixing, suspension or dissolution can be done on the substrate, typically, mixing, suspension or dissolution is performed prior to depositing the materials into or onto the substrate.

The components or materials in the individual regions are prevented from moving to adjacent regions. In one approach, a hydrophobic material, for example, can be used to coat the area of substrate surrounding the individual regions. Such materials prevent aqueous (and certain other polar) Solutions from moving to adjacent regions on the substrate. Of course, when non-aqueous or nonpolar solvents are employed, different surface coatings will be required. Moreover, by choosing appropriate materials (e.g., substrate material, hydrophobic coatings, solvents, etc.), one can control the contact angle of the droplet with respect to the substrate surface. Large contact angles are desired because the area surrounding the reaction region remains unwetted by the solution within the reaction region.

Preferably, regions are created on a substrate by depositing unsilanizable material onto the substrate at defined locations, typically via a template. In a preferred embodiment the template is made of a metal, such as stainless steel with holes drilled into the template to provide the desired pattern on the template. The template is held to the substrate using techniques known to those of skill in the art, such as by magnets on the back of the substrate or clamps around the edges. For "magnetic clamping" the template should be made of a magnetic material, such as an appropriate grade of stainless steel. The unsilanizable material may be deposited by any means known in the art, such as solvent deposition, vapor-deposition techniques or thermal deposition techniques and the like. Techniques for depositing the unsilanizable material depend on the nature of the unsilanizable material and, possibly, the thickness desired. Deposition of the unsilanizable material may be accomplished by techniques known to those of skill in the art, such as those disclosed in U.S. Pat. No. 5,905,356, which is incorporated by reference herein. The unsilanizable material is preferably substantially flat within a region and should be present at as uniform a thickness as practical. Typically the unsilanized material is from 0.1 to 1000 µm thick, preferably from 0.1 to 500 µm thick, preferably 0.1 to 100 µm, preferably 0.1 to 10 µm, more preferably 100 to 1500 Å.

The unsilanizable material preferably comprises any material that can be deposited onto a substrate and that does not substantially react with organosilane agents as defined below. By "not substantially react" is meant that when contacted with an organosilane agent, is will not allow the organosilane agent to silanize the surface. In some embodiments this means that the material does not possess significant surface-bound hydroxyl or other silylchloride-reactive functional groups, and that contact of these materials with silanization agents does not result in the modification of the surface tension of the material. In a preferred embodiment, metals, such as groups 6, 7, 8, 9, 10 or 11 metals of the Periodic Table of the Elements may be used as unsilanizable materials. In a preferred embodiment Au, Cr, Ag, Cu, Ni, Pd, Pt, Mo, W, or Co and combinations thereof comprise the unsilanizable material. In another embodiment the unsilanizable material may be a material that can be removed prior to deposition of the polymer. For example, ink, a photoresist material; adhesives, adhesive tapes, pressure sensitive adhesive tapes, other adhesively adhered material or other materials. Unsilanizable materials may be removed after silanizing the substrate by bead blasting through a mask, photolysis, ozonlysis, chemical etching, abrasive scrubbing or by dissolution in a suitable solvent. In some embodiments more than one layer of the same or different unsilanizable material may be deposited on the substrate.

In a preferred embodiment, the unsilanizable material is gold. The gold is typically present in a region as defined above. In some embodiments the gold is present in an area of about 0.03 to about 7.1 mm$^2$, preferably about 0.08 to about 5 mm$^2$), however larger or smaller areas are within the scope of this invention. In a preferred embodiment the gold is present in a circular form with a diameter of 1 to 3 mm, preferably 1.5 to 2.5 mm. In one example, 200 Å layers of chromium is first deposited, followed by 1000 Å layer of gold. Thinner or thicker layers can be used.

Methods for controlling the local surface free energy of a substrate surface include a variety of techniques apparent to those in the art Chemical vapor deposition and other techniques applied in the fabrication of integrated circuits can be applied to deposit highly uniform layers on selected regions of the substrate surface. If, for example, an aqueous reactant solution is used, the region inside the reaction regions may be hydrophilic, while the region surrounding the reaction regions may be hydrophobic. As such, the surface chemistry can be varied from position to position on the substrate to control the surface free energy and, in turn, the contact angle of the drops of polymeric materials. In this manner, an array of reaction regions can be defined on the substrate surface.

In a preferred method, the substrate is prepared for receiving the material to be characterized by starting with a flat silanizable substrate, overlaying it with a template having holes at regular known positions, then depositing a unsilanizable material layer through the mask to create unsilanizable regions on the substrate surrounded by a silanizable border. By "silanizable substrate" is meant a substrate capable of reacting with a silanizing agent such that the surface tension is altered. In preferred embodiments a silanizable substrate is a substrate composed of a material that possesses significant surface-bound hydroxyl or other silylchloride-reactive functional groups such that contact of the material with a silanization agent results in the modification of the surface tension of the material. Examples include: glass, quartz, silicon, and aluminum. Surface tension is measured by methods known to those of skill in the art using the method described in "Silated Surfaces", Donald E Leyden and Ward T. Collins, Eds., 1980, Gordon and Breach Science Publishers. Thereafter, the substrate is placed in a bath consisting of a 1–5% v/v solution of an organosilane agent, such as trichlorosilane, preferably in a solvent such as dichloromethane or toluene for a period of 30–60 min. The substrate is then rinsed in fresh solvent and wiped with a non-abrasive cloth. This process can be repeated one or more times.

The silane used to modify the surface is preferably chosen to affect the wetting properties of the substrate appropriate for the material to be characterized or the solvent employed to ensure isolation of the regions on the substrate, thereby encouraging the material to remain in the regions. Once the substrate is prepared, the materials or solutions of the materials are deposited in the individual regions on the substrate.

The organosilane agent is preferably represented by the formula: $R_nSiX_{4-n}$ where each X is independently a halogen, preferably chlorine or fluorine and each R is independently selected from the group consisting of alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, silyl, boryl, phosphino, amino, thio, seleno, and combinations thereof, and n is 1, 2 or 3. Preferably the R group(s) are hydrophobic, hydrophillic, or fluorophillic. In a preferred embodiment at least one R group comprises a perfluorinated alkyl chain. Preferred organosilane agents include alkylchlorosilane, perfluoroalkylchlorosilanes and the like. Example include methyltrichlororsilane, phenyltrichlorosilane, octyltrichlorosilane, octadecyltrichlorosilane, and perfluorooctyltrichlorosilane.

As used herein, the phrase "represented by the formula" is not intended to be limiting and is used in the same way that "comprising" is commonly used. The term "independently selected" is used herein to indicate that the R groups, can be identical or different, A named R group will generally have the structure that is recognized in the art as corresponding to R groups having that name. These definitions are intended to supplement and illustrate, not preclude, the definitions known to those of skill in the art.

The term "alkyl" is used herein to refer to a branched or unbranched, saturated or unsaturated acyclic hydrocarbon radical. Suitable alkyl radicals include, for example, methyl, ethyl, n-propyl, i-propyl, 2-propenyl (or allyl), vinyl, n-butyl, t-butyl, i-butyl (or 2-methylpropyl), etc. In particular embodiments, alkyls have between 1 and 200 carbon atoms, between 1 and 50 carbon atoms or between 1 and 20 carbon atoms.

"Substituted alkyl" refers to an alkyl as just described in which one or more hydrogen atom to any carbon of the alkyl is replaced by another group such as a halogen, aryl, substituted aryl, cycloalkyl, substituted cycloalkyl, and combinations thereof. Suitable substituted alkyls include, for example, benzyl, trifluoromethyl and the like.

"Perfluoroalkyl" generally refers to an alkyl chain wherein the hydrogen atoms are replaced with fluorine atoms. In some instances, however, not all of the hydrogen atoms are replaced by fluorine atoms. Whether or not all of the hydrogen atoms are replaced by the fluorine atoms is determined by many factors, such as manufacturing conditions and the chemistry of the reaction. Thus, while a perfluoroalkyl can include both fluorine and hydrogen atoms, in most instances the majority of the hydrogen atoms have been replaced by fluorine atoms.

The term "heteroalkyl" refers to an alkyl as described above in which one or more carbon atoms of the alkyl is replaced by a heteroatom selected from the group consisting of N, O, P, B, S, Si, Sb, Al, Sn, As, Se and Ge. The bond between the carbon atom and the heteroatom may be saturated or unsaturated, Thus, an alkyl substituted with a heterocycloalkyl, substituted heterocycloalkyl, heteroaryl, substituted heteroaryl, alkoxy, aryloxy, boryl, phosphino, amino, silyl, thio, or seleno is within the scope of the term heteroalkyl. Suitable heteroalkyls include cyano, benzoyl, 2-pyridyl, 2-furyl and the like.

The term "cycloalkyl" is used herein to refer to a saturated or unsaturated cyclic non-aromatic hydrocarbon radical having a single ring or multiple condensed rings. Suitable cycloalkyl radicals include, for example, cyclopentyl, cyclohexyl, cyclooctenyl, bicyclooctyl, etc. In particular embodiments, cycloalkyls have between 3 and 200 carbon atoms, between 3 and 50 carbon atoms or between 3 and 20 carbon atoms.

"Substituted cycloalkyl" refers to cycloalkyl as just described including in which one or more hydrogen atom to any carbon of the cycloalkyl is replaced by another group such as a halogen, alkyl, substituted alkyl, aryl, substitute aryl, cycloalkyl, substituted cycloalkyl, heterocycloalkyl, substituted heterocycloalkyl, heteroaryl, substituted heteroaryl, alkoxy, aryloxy, boryl, phosphino, amino, silyl, thio, seleno and combinations thereof. Suitable substituted cycloalkyl radicals include, for example, 4-dimethylaminocyclohexyl, 4,5-dibromocyclohept-4-enyl, and the like.

The term "heterocycloalkyl" is used herein to refer to a cycloalkyl radical as described, but in which one or more or all carbon atoms of the saturated or unsaturated cyclic radical are replaced by a heteroatom such as nitrogen, phosphorous, oxygen, sulfur, silicon, germanium, selenium, or boron. Suitable heterocycloalkyls include, for example, piperazinyl, morpholinyl, tetrahydropyranyl, tetrahydrofuranyl, piperidinyl, pyrrolidinyl, oxazolinyl and the like.

"Substituted heterocycloalkyl" refers to heterocycloalkyl as just described including in which one or more hydrogen atom to any atom of the heterocycloalkyl is replaced by another group such as a halogen, alkyl, substituted alkyl, aryl, substituted aryl, heteroaryl, substituted heteroaryl, alkoxy, aryloxy, boryl, phosphino, amino, silyl, thio, seleno and combinations thereof. Suitable substituted heterocycloalkyl radicals include, for example, N-methylpiperazinyl, 3-dimethylaminomorpholinyl and the like.

The term "aryl" is used herein to refer to an aromatic substituent which may be a single aromatic ring or multiple aromatic rings which are fused together, linked covalently, or linked to a common group such as a methylene or ethylene moiety. The common linking group may also be a carbonyl as in benzophenone or oxygen as in diphenylether or nitrogen in diphenylamine. The aromatic ring(s) may include phenyl, naphthyl, biphenyl, diphenylether, diphenylamine and benzophenone among others. In particular embodiments, aryls have between 1 and 200 carbon atoms, between 1 and 50 carbon atoms or between 1 and 20 carbon atoms.

"Substituted aryl" refers to aryl as just described in which one or more hydrogen atom to any carbon is replaced by one or more functional groups such as alkyl, substituted alkyl, cycloalkyl, substituted cycloalkyl, heterocycloalkyl, substituted heterocycloalkyl, halogen, alkylhalos (e.g., $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The linking group may also be a carbonyl such as in cyclohexyl phenyl ketone.

The term "heteroaryl" as used herein refers to aromatic rings in which one or more carbon atoms of the aromatic ring(s) are replaced by a heteroatom(s) such as nitrogen, oxygen, boron, selenium, phosphorus, silicon or sulfur. Heteroaryl refers to structures that may be a single aromatic ring, multiple aromatic ring(s), or one or more aromatic rings coupled to one or more non-aromatic ring(s). In structures having multiple rings, the rings can be fused together, linked covalently, or linked to a common group such as a methylene or ethylene moiety, The common linking group may also be a carbonyl as in phenyl pyridyl ketone. As used herein, rings such as thiophene, pyridine, isoxazole, phthalimide, pyrazole, indole, furan, etc. or benzo-fused analogues of these rings are defined by the term "heteroaryl."

"Substituted heteroaryl" refers to heteroaryl as just described including in which one or more hydrogen atoms to any atom of the heteroaryl moiety is replaced by another group such as a halogen, alkyl, substituted alkyl, aryl, substituted aryl, heteroaryl, substituted heteroaryl, alkoxy, aryloxy, boryl, phosphino, amino, silyl, thio, seleno and combinations thereof. Suitable substituted heteroaryl radicals include, for example, 4-N,N-dimethylaminopyridine.

The term "alkoxy" is used herein to refer to the $—OZ^1$ radical, where $Z^1$ is selected from the group consisting of alkyl, substituted alkyl, cycloalkyl, substituted cycloalkyl, heterocylcoalkyl, substituted heterocycloalkyl, silyl groups and combinations thereof as described herein. Suitable alkoxy radicals include, for example, methoxy, ethoxy, benzyloxy, t-butoxy, etc. A related term is "aryloxy" where $Z^1$ is selected from the group consisting of aryl, substituted aryl, heteroaryl, substituted heteroaryl, and combinations thereof. Examples of suitable aryloxy radicals include phenoxy, substituted phenoxy, 2-pyridinoxy, 8-quinalinoxy and the like.

As used herein the term "silyl" refers to the $—SiZ^1Z^2Z^3$ radical, where each of $Z^1$, $Z^2$, and $Z^3$ is independently selected from the group consisting of alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

As used herein the term "boryl" refers to the $—BZ^1Z^2$ group, where each of $Z^1$ and $Z^2$ is independently selected from the group consisting of alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

As used herein, the term "phosphino" refers to the group $—PZ^1Z^2$, where each of $Z^1$ and $Z^2$ is independently selected from the group consisting of hydrogen, substituted or unsubstituted alkyl, cycloalkyl, heterocycloalkyl, heterocyclic, aryl, heteroaryl, silyl, alkoxy, aryloxy, amino and combinations thereof.

The term "amino" is used herein to refer to the group $—NZ^1Z^2$, where each of $Z^1$ and $Z^2$ is independently selected from the group consisting of hydrogen; alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

The term "thio" is used herein to refer to the group —$SZ^1$, where $Z^1$ is selected from the group consisting of hydrogen; alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

The term "seleno" is used herein to refer to the group —$SeZ^1$, where $Z^1$ is selected from the group consisting of hydrogen; alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

The term "saturated" refers to lack of double and triple bonds between atoms of a radical group such as ethyl, cyclohexyl, pyrrolidinyl, and the like.

The term "unsaturated" refers to the presence one or more double and triple bonds between atoms of a radical group such as vinyl, acetylenyl, oxazolinyl, cyclohexenyl, acetyl and the like.

Alternatively or additionally, a dimple or other recess can be used in combination with the above to prevent the materials in the individual regions from moving to adjacent regions and or to provide a means for the material to dry in a more uniform thickness. If the substrate used in the present invention is to contain dimples or other recesses, the dimples should be sufficiently small to allow close packing on the substrate, mostly for economical reasons. The dimples typically have the same area as the regions defined above. Preferably, the dimples will be less than about 5 mm in diameter, less than 1 mm in diameter, preferably less than 0.5 mm in diameter. For inorganic materials, typically a dimple of about 1–3 mm in diameter is employed. In some embodiments, the depth of such dimples will preferably be less than 100 μm and more preferably less than 25 μm and most preferably less than 10 μm below the upper surface of the substrate. In other embodiments, for example where a greater bulk of material is desired, the depth of such dimples will be in the range of about 10 μm to about 1,000 μm. In a preferred embodiment the unsilanizable material is coated in the dimple.

A preferred approach to creating the dimples in the substrate is to have a dimple created by bead blasting, which creates a dimple surface that is somewhat rough, i.e., not completely smooth. The roughness of the dimple surface is not preferably so rough such that dimples within dimples are created. In other words, preferably, the dimple surface is rough enough to assist in adhesion of the material to the dimple.

Even when a dimpled surface is employed, it is desirable to ensure that the substrate material is not wetted beyond the region parameters. Whether or not a liquid droplet will wet a solid surface is governed by three tensions: the surface tension at the liquid-air interface, the interfacial tension at the solid-liquid interface and the surface tension at the solid-air interface. If the sum of the liquid-air and liquid-solid tensions is greater than the solid-air tension, the liquid drop will form a bead (a phenomenon known as "lensing"). If, on the other hand, the sum of the liquid-air and liquid-solid tensions is less than the solid-air tension, the drop will not be confined to a given location, but will instead spread over the surface. Even if the surface tensions are such that the drop will not spread over the surface, the contact or wetting angle (i.e., the angle between the edge of the drop and the solid substrate) may be sufficiently small that the drop will cover a relatively large area (possibly extending beyond the confines of a given reaction region). Further, small wetting angles can lead to formation of a thin (approximately 10 to 20°) "precursor film" which spreads away from the liquid bead. Larger wetting angles provide "taller" beads that take up less surface area on the substrate and do not form precursor films. Specifically, if the wetting angle is greater than about 90°, a precursor film will not form.

In a preferred embodiment the contact angle between the substrate and the polymeric material deposited on the substrate is greater than 90°. Contact angle is measured by Gonimetry as known by those skilled in the art. In most embodiments used during practice of this invention, the contact angle of the sample in solution or suspension is not measured. Instead, those practicing this invention will have some understanding of the type of polymer being characterized and therefore reliance may be placed on the volume of liquid or suspension per unit area of the region to avoid overshooting a particular contact angle. Regions of many different sizes are useful with this invention and selection of a particular region size is within the skill of those of ordinary skill in the art upon review of this specification. Region size is typically determined based on practical considerations, such as the capabilities of the characterization apparatus in use, the number of samples to be characterized in a given amount of time as well as the capabilities of the deposition apparatus (such as whether such deposition apparatus is automated to a high degree of precision or is manual). The amount of liquid that can be deposited in a region is limited only by the size of the region and the surface tension of the area surrounding the region. (See the above description of regions for preferred sizes) In preferred embodiments, the volume of liquid or suspension of polymer per area of region is in the range of from 0.1 $\mu L/mm^2$ to about 5 $\mu L/mm^2$. These volumes are used with the region area to determine particular volumes for particular areas.

In addition to the volume of liquid or suspension per unit area region, the amount of polymeric sample deposited in each region depends on the concentration of sample in the liquid of suspension. The concentration of polymer in solution or suspension is in turn dependant on the nature of the polymer sample and the chosen solvent. The polymer sample is preferably a liquid polymer sample, such as a polymer solution, a polymer dispersion or a polymer that is liquid in the pure state (i.e., a neat polymer). A polymer solution comprises one or more polymer components dissolved in a solvent. The polymer solution can be of a form that includes well-dissolved chains and/or dissolved aggregated micelles. The solvent can vary, depending on the application, for example with respect to polarity, volatility, stability, and/or inertness or reactivity. Typical solvents include, for example, tetrahydrofuran (THf), toluene, hexane, ethers, trichlorobenzene, dichlorobenzene, dimethylformamide, water, aqueous buffers, alcohols, etc. Exemplary polymers that can be in the form of neat polymer samples include dendrimers, and siloxane, among others. The liquid polymer sample can also be employed in the form of a slurry, a latex, a microgel a physical gel, or in any other form. Liquid samples are useful in the automated sample-handling tools that prepare and automatically sample each member of a polymer library. In some cases, polymer synthesis reactions (i.e., polymerizations) directly produce liquid samples. These may be bulk liquid polymers, polymer solutions, or heterogeneous liquid samples. In other cases, the polymer may be synthesized, stored or otherwise available for characterization in a non-liquid physical state, such as a solid state (e.g., crystalline, semicrystalline or amorphous), a glassy state or rubbery state. Hence, the polymer sample may need to be dissolved or dispersed to form a liquid sample by addition of a continuous liquid-phase such as a solvent.

The polymer sample can be a homogeneous polymer sample or a heterogeneous polymer sample, and in either case, comprises one or more polymer components. As used herein, the term "polymer component" refers to a sample component that includes one or more polymer molecules. The polymer molecules in a particular polymer component have the same repeat unit, and can be structurally identical to each other or structurally different from each other. For example, a polymer component may comprise a number of different molecules, with each molecule having the same repeat unit, but with a number of molecules having different molecular weights from each other (e.g., due to a different degree of polymerization). As another example, a heterogeneous mixture of copolymer molecules may, in some cases, be included within a single polymer component (e.g., a copolymer with a regularly-occurring repeat unit), or may, in other cases, define two or more different polymer components (e.g., a copolymer with irregularly-occurring or randomly-occurring repeat units). Hence, different polymer components include polymer molecules having different repeat units. It is possible that a particular polymer sample (e.g., a member of a library) will not contain a particular polymer molecule or polymer component of interest.

The polymer molecule of the polymer component is preferably a non-biological polymer. A non-biological polymer is, for purposes herein, a polymer other than an amino-acid polymer (e.g., protein) or a nucleic acid polymer (e.g., deoxyribonucleic acid (DNA)). The non-biological polymer molecule of the polymer component is, however, not generally critical; that is, the systems and methods disclosed herein will have broad application with respect to the type (e.g., architecture, composition, synthesis method or mechanism) and/or nature (e.g., physical state, form, attributes) of the non-biological polymer. Hence, the polymer molecule can be, with respect to homopolymer or copolymer architecture, a linear polymer, a branched polymer (e.g., short-chain branched, long-chained branched, hyper-branched), a cross-linked polymer, a cyclic polymer or a dendritic polymer. A copolymer molecule can be a random copolymer molecule, a block copolymer molecule (e.g., di-block, tri-block, multi-block, taper-block), a graft copolymer molecule or a comb copolymer molecule. The particular composition of the non-biological polymer molecule is not critical, and can include repeat units or random occurrences of one or more of the following, without limitation: polyethylene, polypropylene, polystyrene, polyolefin, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polyacrylate, poly(ethylene oxide), poly(ethyleneimine), polyamide, polyester, polyurethane, polysiloxane, polyether, polyphosphazine, polymethacrylate, and polyacetals. Polysaccharides are also preferably included within the scope of non-biological polymers. While some polysaccharides are of biological significance, many polysaccharides, and particularly semi-synthetic polysaccharides have substantial industrial utility with little, if any biological significance. Exemplary naturally-occurring polysaccharides include cellulose, dextran, gums (e.g., guar gum, locust bean gum, tamarind xyloglucan, pullulan), and other naturally-occurring biomass. Exemplary semi-synthetic polysaccharides having industrial applications include cellulose diacetate, cellulose triacetate, acylated cellulose, carboxymethyl cellulose and hydroxypropyl cellulose. In any case, such naturally-occurring and semi-synthetic polysaccharides can be modified by reactions such as hydrolysis, esterification, alkylation, or by other reactions.

Thus, in preferred embodiments, the material deposited on the substrate is a polymer of one or more olefins and or acetylenes. The monomers that are polymerized to form the polymers to be deposited herein include linear, cyclic and branched olefins. The olefins may contain more than one double bond and may also contain one or more heteroatoms. Preferred olefin monomers include molecules comprising up to 40 carbon atoms and optionally comprising one or more heteroatoms. Preferred olefin monomers include ethylene, propylene, butylene, isobutylene, pentene, isopentene, cyclopentene, pentadiene, 3-methyl pentene, 2-methyl pentene, cyclopentadiene, hexene, isohexene, hexadiene, cyclohexene, 3,5,5-trimethyl hexene-1, heptene, cycloheptene, heptadiene, octene, cyclooctene, octadiene, nonene, decene, isodecene, cyclodecene, decadiene, dodecene, styrene and the like. The monomers may also comprise polar monomers such as acrylic acids, acrylates, alkyl acrylates, vinyl chlorides, acrylonitriles, vinyl acetates, acrylamides and the like. Preferred polymers comprise polymers of ethylene and/or propylene and a $C_1$ to $C_{40}$ alpha olefin. Preferred alpha olefins include ethylene, propylene, butene, isoprene, isobutylene, octene, hexene, styrene and the like. The polymers to be deposited herein may be plastics, plastomers, elastomers, oils waxes or the like. The polymers may have a weight average molecular weight of from 100 to 2 million or more. The molecular weight desired will be determined by the desired end use, as is well known to hose of ordinary skill in the art. The polymers may have a density of from 0.85 to 0.98 g/cc as measured by ASTM standards. Preferred polymers include ethylene homopolymers and copolymers, propylene homopolymers of copolymers, butylene homopolymers and copolymers, isobutylene homopolymers and copolymers, styrene homopolymers and copolymers, acrylate homopolymers and co-polymers. Preferred polymers include homopolyethylene, homopolypropylene, polyethylene-co-propylene, polypropylene-co-ethylene, polyethylene-co-butylene, polypropylene-co-butylene, polyethylene-co-propylene-co-diene termonomer (hexadiene for example), polyethylene-co-octene, polymethylmethacrylate, and ethylene vinyl chloride.

In other preferred embodiments, the polymer sample is a polymerization product mixture. As used herein, the term "polymerization product mixture" refers to a mixture of sample components obtained as a product from a polymerization reaction. An exemplary polymerization product mixture can be a sample from a combinatorial library prepared by polymerization reactions, or can be a polymer sample drawn off of an industrial process line. In general, the polymer sample may be obtained after the synthesis reaction is stopped or completed or during the course of the polymerization reaction. Alternatively, samples of each polymerization reaction can be taken and placed into an intermediate array of vessels at various times during the course of the synthesis, optionally with addition of more solvent or other reagents to arrest the synthesis reaction or prepare the samples for analysis. It is also possible to use polymer samples or libraries of polymer samples that were prepared previously and stored. Typically, polymer libraries can be stored with agents to ensure polymer integrity. Such storage agents include, for example, antioxidants or other agents effective for preventing cross-linking of polymer molecules during storage. Depending upon the polymerization reaction, other processing steps may also be desired, all of which are preferably automated. The polymerization scheme and/or mechanism by which the polymer molecules of the polymer component of the sample are prepared is not critical, and can include, for example, reactions considered to be addition polymerization, condensation polymerization, step-growth polymerization, and/or chain-growth polymerization reactions. Viewed more specifically with respect to the mechanism, the polymerization reaction can be radical polymerization, ionic polymerization (e.g., cationic polymerization, anionic polymerization), and/or ring-opening polymerization reactions, among others. Non-limiting examples of the foregoing include, Ziegler-Natta or Kaminsky-Sinn reactions and various copolymerization reactions. Polymerization product mixtures can also be prepared by modification of a polymeric starting materials, by grafting reactions, chain extension, chain scission, functional group interconversion, or other reactions.

In preferred embodiments, auto-sampling techniques are employed to at least partially dissolve the polymer sample and/or deposit the polymer sample on or in the region(s) of the substrate. Preferred auto-sampling techniques are described in detail in co-pending, commonly assigned U.S. patent application Ser. No. 09/285,363, filed Apr. 2, 1999 (and corresponding WO 99/51980), both of which are incorporated herein by reference for all purposes. In particular, Examples 1 and 2 therein describe automated sampling robots in detail. Using those techniques, polymer samples may be deposited sequentially or simultaneously.

Typically, the polymers are combined with a liquid, such as a solvent, placed in a dispensing apparatus and deposited onto the substrate at a predefined region. As discussed above, the liquid may be any solvent capable of dissolving or suspending the polymer and may be flashed or evaporated off prior to characterization or allowed to remain during characterization.

In a preferred embodiment this invention relates to a method for forming an array of polymeric materials to be characterized on a substrate comprising:

(a) selecting one or more polymers, as described herein, (b) dissolving or suspending each polymer in a liquid, (c) placing each polymer containing liquid in a dispensing means (such as an automated pipette), and (d) depositing a uniform amount of the polymer containing liquid onto a substrate having hydrophilic and/or hydrophobic regions.

The polymers are generally not mixed in a common liquid prior to deposition.

In a preferred embodiment step (d) comprises depositing a uniform amount of the polymer containing liquid onto gold on a substrate, preferably where the substrate has been prepared by overlaying a template containing holes onto a substrate, depositing gold onto the substrate, thereafter contacting the substrate with an organosilane agent as described above.

The polymer containing liquid may be deposited multiple times, depending on the concentration of the polymer in solution or suspension and the desired thickness of the sample in the array. In some embodiment the polymer containing liquid may be deposited two times, three times or even four or more times in the same predefined region. As those of skill in the art will appreciate, the thickness of the polymer sample in the array is dependent on the analysis or characterization technique being applied. Thus, for example, a sample thickness of at least about 30 $\mu$m is desired for some thick film analyses, such as FTIR. Conversely, a sample thickness of about 1 $\mu$m to about 20 $\mu$m is desirable for thin film analyses, or example, where the absorbance needs to be controlled.

In a preferred embodiment a polymer forms a film over the gold. The film preferably is uniform but may also form a film where the edges are thicker than the center. In preferred embodiment the thickness of the polymer film is preferably at least 1 $\mu$m at the center of the film, preferably at least 5 $\mu$m, preferably at least 10 $\mu$m.

This invention also relates to an array of polymeric materials for use in characterization, comprising:

(a) a substrate having a layer of unsilanizeable material (such as gold) in a plurality of regions on the substrate and an organosilane coated on the substrate where the unsilanizeable material (e.g., gold) is not located, and (b) a polymer deposited on the unsilanizable material. Preferably the substrate comprise at least 10 regions, more preferably at least 15 regions, more preferably at least 20 regions, even more preferably at least 50 regions, even more preferably at least 64 regions, even more preferably at least 96 regions, and even more preferably at least 128 regions. This embodiment of the invention is shown graphically in FIG. 1. FIG. 1 shows that silanizable substrate having regions of unsilanizable material layed over the substrate. After treatment with the organosilane reagent, a silane layer (not shown) covers that substrate, but not the regions. As discussed above, the unsilanizable material may be removed from the regions in some embodiments. The substrate then has dissolved or suspended polymeric materials deposited onto the regions, and those materials are confined to the regions due to the difference in chemical potential between the organosilane reagent and the unsilanizable material.

Essentially, any conceivable substrate can be employed in the invention, so long as it may be silanized. The substrate can be organic, inorganic, biological, nonbiological, or a combination of any of these, existing as particles, strands, precipitates, gels, sheets, tubing, spheres, containers, capillaries, pads, slices, films, plates, slides, etc. The substrate can have any convenient shape, such a disc, square, sphere, circle, etc. The substrate is preferably flat, but may take on a variety of alternative surface configurations. For example, the substrate may contain raised or depressed regions. The substrate may be any of a wide variety of materials including, for example, polymers, plastics, Pyrex, quartz, resins, silicon, silica or silica-based materials, aluminum, carbon, metals, inorganic glasses, inorganic crystals, membranes, etc. Other substrate materials will be readily apparent to those of skill in the art upon review of this disclosure. Surfaces on the substrate can be composed of the same materials as the substrate or, alternatively, they can be different, i.e., the substrates can be coated with a different material.

A single substrate can have at least 10, 25, 50, 64, 98 or 124 different materials and, more preferably, at least 100 to 500 different materials thereon. The materials may be synthesized in situ or transferred to the substrate. The density of regions per unit area will be greater than 0.04 regions/cm$^2$, more preferably greater than 0.1 regions/cm$^2$, even more preferably greater than 1 region/cm$^2$, even more preferably greater than 10 regions/cm$^2$, and still more preferably greater than 100 regions/cm$^2$. In most preferred embodiments, the density of regions per unit area will be greater than 1,000 regions/cm$^2$, more preferably 10,000 regions/cm$^2$, and even more preferably greater than 100,000 regions/cm$^2$.

Once the array of polymeric materials has been delivered to regions on the substrate, the entire array can be dried, calcined, sintered or otherwise heat treated at various conditions for various times for flashing off solvent, etc. prior to being characterized. Heating times, temperatures and atmospheres can be adjusted as desired. Heating history, such as ramp rates and heating times, can affect the phase purity, crystallinity and properties of the materials. For example, heating with multiple steps may be desired.

Of general importance for this invention, is that the materials not react substantially with the substrate or region. Although some interdiffusion of molecules between the substrate and the one or more mixtures can be tolerated as a result of the drying, heating, calcinating or sintering step(s), the bulk of the material made should not include components or molecules from the substrate. Heating times and temperatures can be adjusted to account for different mixtures in conjunction with different substrate compositions. In converse, however, the mixtures should remain associated with the regions on the substrate after drying, sintering, calcinating and/or heating. For example, in the case of a substrate containing dimples (i.e., regions), the materials should remain in the dimple. Also, by remaining associated with a region, the materials in the array typically cannot interdiffuse.

Figure 2:
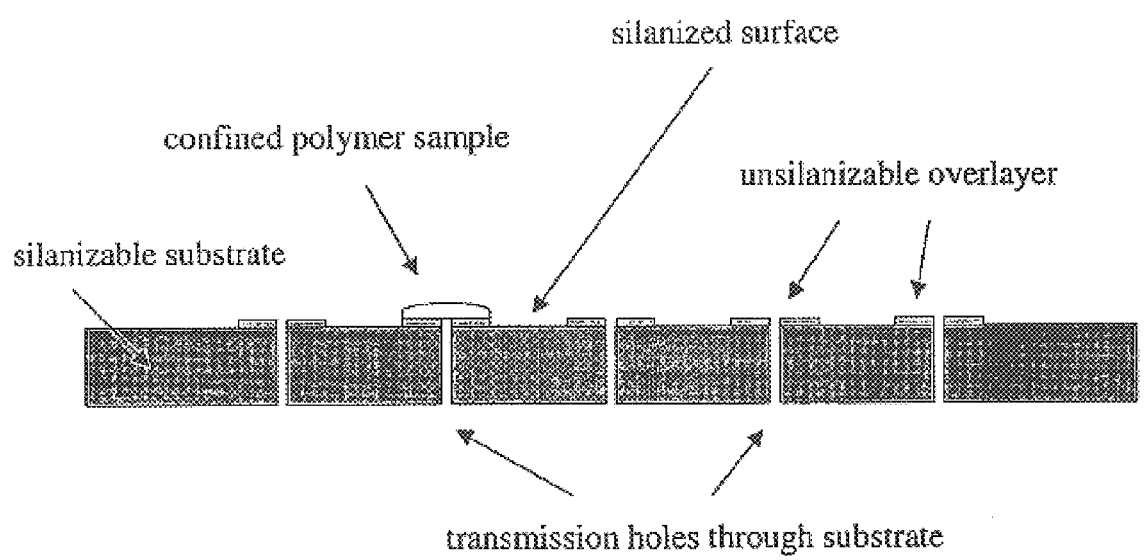
FIG. 2 is a drawing of a silanizable substrate prepared with unsilanizable regions having a hole running through the region and the substrate, with one such region having a polymeric sample deposited thereon; the embodiment shown in this figure is useful in transmission characterization techniques.

Once the materials have been placed in the known regions on the substrate, and optionally treated (i.e. heat treated to alter crystallization, etc.), then the materials can be rapidly characterized. For characterization techniques that require being able to project through the sample (for example any transmission spectroscopy), a predrilled or etched hole through the substrate (and unsilanizable material layer, if present) in the region containing the unsilanizable material layer can be used. In this case the polymer film is suspended over the hole. The hole is preferably covered by the polymer to be characterized. The hole may be anywhere in the unsilanizable area. In one embodiment the hole is at the center of the area. The hole is of a size so that the surface tension of the polymer sample prevents the sample that is deposited from flowing through the hole. Thus, the hole may be in the range of from about 200 $\mu$m to about 1 mm in diameter. However, larger or smaller sizes are still within the scope of the invention. A graphical picture of this embodiment is shown in FIG. 2, which shows a cross section of the substrate, unsilanizable overlayer regions and confined polymer sample. A hole for transmission spectroscopy is provided that is of sufficient size for the desired wavelengths to pass through, but not the polymer sample as dissolved or suspended.

Preferred embodiments for the high-throughput characterization of polymer materials confined within such a substrate include the spectroscopic techniques Reflectance Infrared Spectroscopy, Transmission Infrared Spectroscopy, Infrared Emission Spectroscopy, UV-Visible Spectroscopy, Raman Spectroscopy, X-ray Fluorescence Spectroscopy, X-Ray Scattering, and X-ray Diffraction. In another embodiment, this invention can be practiced with the Apparatus for Rapid Screening of Array Based Materials Characterization as described in U.S. Ser. No. 09/458,398 filed Dec. 10, 1999, which is incorporated by reference herein.

For example, after the materials are deposited onto known positions on the substrate, the substrate is attached to a translation stage that is interfaced to the spectroscopic instrument. Each element on the substrate is moved in a sequential fashion to an appropriate position to allow spectroscopic measurement. In an alternative embodiment, the entire collection of elements is measured simultaneously using a spectroscopic instrument capable of parallel sample measurement.

EXAMPLES

Example 1

Poly(ethylene-co-octene)

A reflection FTIR substrate is prepared by evaporative deposition onto a polished silicon wafer of dots of 3 mm diameter consisting of 200 Å chromium followed by 1000 Å of gold, followed by silanization of the wafer in a 1% (v/v) solution of 1H,1H,2H,2H-perfluorooctyltrichlorosilane in toluene.

Poly(ethylene-co-octene) (PEO) samples produced from the copolymerization of ethylene and 1-octene using known Ziegler-Natta catalysts (and available from Aldrich Chemical Company) are dissolved in a volume of 1,2,4-trichlorobenene (tcb) at 150° C. to give solutions of 10 mg/mL concentration. The tcb contains 10 ppm 2,6-di(tert-butyl)- 4-methylphenol or other suitable anti-oxidant to protect against oxidative degradation of the polymer samples.

The reflection FTIR substrate is mounted onto a heated block and maintained at a temperature of 80° C. Using a heated transfer needle, a 5 $\mu$L aliquot of each solution is transferred onto an unsilanized region of the substrate. The sample is dried through evaporative loss of solvent. A second aliquot of each solution is deposited at the same position as the first deposition. After the solvent has evaporated, the substrate and samples are heated under a stream of N$_2$ for 10 minutes to remove residual tcb.

The instrument for measuring the refection FTIR spectrum is a Bruker Opus 55 Spectrophotometer with an external IRScope-II confocal IR microscope coupled to a motorized X-Y stage. The substrate is mounted onto the motorized stage and the alignment beam is positioned over a gold dot on the substrate that does not contain a polymer sample. The Z position is adjusted to maximize signal intensity. A background measurement is acquired and saved. A sample measurement is taken. The film thickness under these conditions is such that the absorption at 1378 cm$^{-1}$ is between 0.1—0.4 absorbance units. Spectroscopic measurements are then performed on the polymer samples in a serial fashion. The data are collected and analyzed as per an appropriate spectroscopic method.

Example 2

Poly(ethylene-co-ethylacrylate)

A reflection FTIR substrate is prepared by evaporative deposition onto a polished silicon wafer of an 8×8 array of dots of 3 mm diameter consisting of 200 Å chromium followed by 1000 Å of gold. The substrate is silanization in a 1% (v/v) solution of 1H,1H,2H,2H-perfluorooctyltrichlorosilane in toluene for 30 minutes, rinsed in fresh toluene, and then wiped with a non-abrasive cloth.

Commercial poly(ethylene-co-ethylacrylate) (PEEA) samples produced from the radical copolymerization of ethylene and ethylacrylate are dissolved in a volume of toluene at 80° C. to give solutions of 1 mg/mL concentration. The toluene contains 10 ppm 2,6-di(tert-butyl)-4-methylphenol or other suitable anti-oxidant to protect against oxidative degradation of the polymer samples.

The reflection FTIR substrate is mounted onto a heated block and maintained at a temperature of 50° C. Using a heated transfer needle, a 5 µL aliquot of each solution is transferred onto an unsilanized region of the substrate. The sample is dried through evaporative loss of solvent then the substrate and samples are heated under a stream of $N_2$ for 10 minutes to remove residual toluene.

The instrument for measuring the refection FTIR spectrum is a Bruker Opus 55 Spectrophotometer with an external IRScope-II confocal IR microscope coupled to a motorized X-Y stage. A microscope lens is selected to provide a 100 µM diameter beam. The substrate is mounted onto the motorized stage and the alignment beam is positioned over a gold dot on the substrate that does not contain a polymer sample. The Z position is adjusted to maximize signal intensity. A background measurement is acquired and saved. A sample measurement is taken. The film thickness under these conditions is such that the absorption at 1720 $cm^{-1}$ is between 0.5–0.8 absorbance units. Spectroscopic measurements are then performed on the polymer samples in a serial fashion. The data are collected and analyzed as per an appropriate spectroscopic method.

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles, and references, including patent applications, priority documents, testing procedures and publications, are incorporated herein by reference for all purposes.

What is claimed is:

1. A method for forming and characterizing an array of non-biological polymeric materials comprising:

defining at least 10 regions on a silanizable substrate by depositing in those regions a region-defining material, thereafter contacting the substrate and the region-defining material with an organosilane agent to silanize the substrate without modifying the surface tension of the region-defining material, optionally, partially or completely removing the region-defining material, depositing at least 10 non-biological polymeric materials onto said regions, and characterizing the non-biological polymeric materials.

2. The method of claim 1 wherein said deposition step additionally comprises overlaying a template comprising holes for said regions onto said substrate, the template comprising holes at regular known intervals and depositing said region-defining material onto said substrate through said holes.

3. The method of claim 1 wherein the region-defining material is deposited onto the substrate via thermal deposition or vapor deposition.

4. The method of claim 1 wherein the region-defining material comprises a group 6, 7, 8, 9, 10, or 11 metal from the Periodic Table of the Elements or combinations thereof.

5. The method of claim 1 wherein the organosilane agent is represented by the formula: $R_nSiX_{4-n}$ where each X is independently a halogen, each R is independently selected from the group consisting of alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, silyl, boryl, phosphino, amino, thio, seleno, and combinations thereof; and n is 1, 2 or 3.

6. The method of claim 5 wherein X is chlorine, fluorine or bromine.

7. The method of claim 5 wherein n is 1.

8. The method of claim 5 wherein n is 1, each X is chlorine, and R is an alkyl or substituted alkyl.

9. The method of claim 1 wherein the organosilane agent is hydrophobic.

10. The method of claim 1 wherein the organosilane agent is hydrophilic.

11. The method of claim 1 wherein the characterization is by infrared spectroscopy or X-ray fluorescence.

12. The method of claim 1 wherein the region-defining material is selected from the group consisting of Au, Cr, Ag, Cu, Ni, Pd, Pt, Mo, W, Co and combinations thereof.

13. The method of claim 1 wherein the at least 10 non-biological polymeric materials are polymers of one or more olefin monomers.

14. The method of claim 1 wherein the at least 10 non-biological polymer materials are different from each other.

15. The method of claim 1 wherein each region has a hole therethrough and the non-biological polymeric material in the region covers the hole.

16. A method for forming an array of non-biological polymeric materials to be characterized on a substrate comprising:

(a) selecting ten or more different non-biological polymers, (b) dissolving or suspending each non-biological polymer in a separate liquid, (c) overlaying a template containing ten or more holes onto a substrate, (d) depositing a material onto the substrate, thereby defining regions on the substrate, (e) removing the template, (f) thereafter contacting the substrate and the material with an organosilane agent to modify the surface tension of the substrate without modifying the surface tension of the material, (g) optionally removing part or all of the material, and depositing a uniform amount of each of the ten or more non-biological polymer containing liquids onto the regions of the substrate, wherein the regions are hydrophilic or hydrophobic.

17. The method of claim 16 wherein the regions have material deposited thereon prior to the dispensing step.

18. The method of claim 16 wherein the same non-biological polymer containing liquid is deposited multiple times at the same region on the substrate.

19. The method of claim 16 wherein during the depositing step the uniform amount of liquid deposited is a volume per unit area of the region in the range of from about 0.1 $µL/mm^2$ to about 5 $µL/mm^2$.

20. The method of claim 16 wherein the non-biological polymer forms a film having a thickness of at least about 0.1 to about 1000 µm at the center of the film.

21. The method of claim 16 wherein the liquid has been removed from the polymer containing liquid after deposition onto the substrate.

22. A method for forming and characterizing an array of non-biological polymeric materials comprising:

defining at least 10 regions on a silanizable substrate by depositing in those regions a region-defining material, thereafter contacting the substrate and the region-defining material with an organosilane agent to silanize the substrate under conditions in which the region-defining material does not substantially react with the organosilane agent, optionally, partially or completely removing the region-defining material, depositing at least 10 non-biological polymeric materials onto said regions, and characterizing the non-biological polymeric materials.

23. The method of claim 22, wherein the region-defining material does not possess significant surface bound hydroxyl or other silylchloride-reactive functional groups.

24. The method of claim 22 wherein said deposition step additionally comprises overlaying a template comprising holes for said regions onto said substrate, the template comprising holes at regular known intervals and depositing said region-defining material onto said substrate through said holes.

25. The method of claim 22 wherein the region-defining material comprises a group 6, 7, 8, 9, 10, or 11 metal from the Periodic Table of the Elements or combinations thereof.

26. The method of claim 22 wherein the region-defining material is deposited onto the substrate via thermal deposition or vapor deposition.

27. The method of claim 22 wherein the organosilane agent is represented by the formula: $R_nSiX_{4-n}$ where each X is independently a halogen, each R is independently selected from the group consisting of alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, silyl, boryl, phosphino, amino, thio, seleno, and combinations thereof, and n is 1, 2 or 3.

28. The method of claim 22 wherein the characterization is by infrared spectroscopy or X-ray fluorescence.

29. The method of claim 22 wherein the region-defining material is selected from the group consisting of Au, Cr, Ag, Cu, Ni, Pd, Pt, Mo, W, Co and combinations thereof.

30. The method of claim 22, further comprising partially or completely removing the region-defining material from the substrate, prior to depositing the non-biological polymeric materials on the substrate.

31. The method of claim 1, further comprising partially or completely removing the region-defining material from the substrate, prior to depositing the non-biological polymeric materials on the substrate.

32. The method of claim 16, further comprising partially or completely removing the material from the substrate, prior to depositing the non-biological polymeric materials on the substrate.

33. A method for forming an array of polymeric materials comprising:

forming a reflection FTIR substrate comprising:

defining at least 10 regions on a silanizable substrate by depositing in those regions a material, thereafter contacting the substrate and the material with an organosilane agent to silanize the substrate without modifying the surface tension of the material, and depositing at least 10 polymeric materials onto said regions of the reflection FTIR substrate.

34. The method of claim 33, wherein the material comprises a group 6, 7, 8, 9, 10, or 11 metal from the Periodic Table of the Elements or combinations thereof.

35. The method of claim 34, wherein the material is gold.

36. The method of claim 33, wherein the material comprises two or more layers of metals selected from the group consisting of Au, Cr, Ag, Cu, Ni, Pd, Pt, Mo, W, Co and combinations thereof.

37. The method of claim 36 wherein the material comprises a layer of Cr and a layer of Au.

38. The method of claim 33 wherein said deposition step additionally comprises overlaying a template comprising holes for said regions onto said substrate, the template comprising holes at regular known intervals and depositing said material onto said substrate through said holes.

39. The method of claim 33 wherein the organosilane agent is represented by the formula: $R_nSiX_{4-n}$ where each X is independently a halogen, each R is independently selected from the group consisting of alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, silyl, boryl, phosphino, amino, thio, seleno, and combinations thereof; and n is 1, 2 or 3.

40. The method of claim 39 wherein X is chlorine, fluorine or bromine.

41. The method of claim 39 wherein n is 1.

42. The method of claim 39 wherein n is 1, each X is chlorine, and R is an alkyl or substituted alkyl.

43. The method of claim 33 wherein the organosilane agent is hydrophobic.

44. The method of claim 33 wherein the organosilane agent is hydrophilic.

45. The method of claim 33 wherein the at least 10 polymer materials are different from each other.

46. The method of claim 33 wherein each region has a hole therethrough and the polymeric material in the region covers the hole.

* * * * *